United States Patent [19]

Kelly

[11] Patent Number: 5,475,757
[45] Date of Patent: Dec. 12, 1995

[54] SECURE DATA TRANSMISSION METHOD

[75] Inventor: Joseph P. Kelly, Howell, N.J.

[73] Assignee: AT&T Corp., Murray Hill, N.J.

[21] Appl. No.: 255,207

[22] Filed: Jun. 7, 1994

[51] Int. Cl.$^6$ .................................................... H04K 1/00
[52] U.S. Cl. ............................... 380/24; 380/21; 380/23
[58] Field of Search ................................. 380/21, 23, 25, 380/24, 4, 49

[56] References Cited

U.S. PATENT DOCUMENTS

5,202,921  4/1993  Herzberg et al. ........................ 380/23
5,371,794  12/1994  Diffie et al. ............................. 380/21

Primary Examiner—David C. Cain

[57] ABSTRACT

A method of secure data transmission commences at a sending or originating terminal by processing a sender challenge on an originating subscriber card with a secret originating subscriber coding key to obtain an originating subscriber response. The response is used at the originating terminal to encrypt the message to be securely transmitted. The thus-encrypted message is transmitted, together with the sender challenge in its original form, to a system server. The server retrieves the originating subscriber coding key from a repository to which it has access, and uses the key to generate a response that is identical to that produced by the originating subscriber. It then employs the so-obtained response to decrypt the originator's encrypted message, determines the intended recipient, and retrieves from the repository the coding key assigned to such recipient. The server then issues a new challenge and repeats the above processing and encryption steps using the recipient's subscriber's coding key, thereby re-encoding the message and sending the thus re-encrypted message and the unencrypted new challenge to the receiving station where the same process is employed on the recipient subscriber card to obtain, from the unencrypted new challenge and the recipient subscriber code key stored on the recipient subscriber card, the receiving subscriber response to be used in decryption of the received, server re-encrypted message.

7 Claims, 2 Drawing Sheets

SECURE DATA TRANSMISSION METHOD

FIELD OF THE INVENTION

The present invention relates to the telecommunications field in general, and more particularly to the area of encryption and decryption of electronically transmitted messages.

BACKGROUND ART

As electronic mail and other data transmission methods gain in popularity and become more and more widespread both as to the number of people availing themselves of such services and the number of messages being sent by way of these channels, there is a growing need for simple, secure and reliable encryption of the data being transmitted. This is especially so because a steadily increasing proportion of such data is of a proprietary or otherwise sensitive nature which, were such information to fall into the wrong hands, could be detrimental or, at the very least, embarrassing to the issuer of the transmitted information and/or its intended recipient.

To satisfy this need for transmission security, there have been developed and are currently available a variety of devices and algorithms for encoding information to be transmitted and for subsequently decoding the encoded information after it has reached the intended recipient. Of course, it is important to encrypt the information in such a manner as to make it difficult, if not substantially impossible, to break the code or key used in the encryption. This, coupled with safeguarding of the key itself by all persons having access to that key, provides a high degree of assurance that anyone who may have received or intercepted the transmission without being authorized to learn of its contents will be unable to decipher the message contained in the transmission.

Of course, it would be possible, and is in fact required when operating in accordance with the Digital Encryption Standard (DES) currently applicable to electronic mail (E-mail), for the issuer and the intended recipient to agree upon or notify one another of a particular encoding key to be used. Such key could then be employed for all encrypted communications sent by the respective issuer, or all those taking place between the respective parties, or such communications occurring within a certain time span, as on a particular day, or even to individual messages. This encoding key information exchange may take place either well in advance of the time for a particular communication or, especially when using a different key for each transmission, just prior to the intended transmission time.

Each of these approaches, however, suffers from one or more serious disadvantages. For one thing, the wider the dissemination of the key, the more likely that its safety will be compromised. Similarly, the longer the key is in use—in terms of time alone or of the cumulative length of the transmissions sent—the more likely it is that it may be broken or discovered by an interloper. In addition, the greater the number of keys to be used—either for different recipients or for different time periods—the more difficult it is to assure that the proper key will be used for the particular transmission. Finally, the more often the parties need to obtain or forward the encoding keys, the more likely it is that the particular key will be intercepted during such information exchange, even if not only a different communication but also a different communications channel (such as a telephone) than that to be used for the coded data transmission (i.e. a data link) were to be employed to carry the information about the encoding key.

These and other deficiencies have lead to the development of additional alternatives to secure data transmission. One currently employed alternative approach, commonly referred to as RSA public key encryption, involves the use of a total of four encryption keys—two for each party, one public and the other private. Each party knows (e.g. is able to retrieve from a safe storage location) its own public and private keys, and is able to obtain the public key of the respective other party since that key, as its name implies, is available to the "public", or at least to the system users or subscribers. In use, two such keys are actually employed at each of the issuing and receiving ends. More particularly, the initiator or originator of the transmission (i.e. the party desiring to send an encrypted message) first encodes the message using his or her own private code key, and then re-encodes such encoded message using the other party's (intended recipient's) public code key. The thus doubly-encoded message is then sent to the intended recipient and must be decoded at that end before the original message can be deciphered. To this end, a double decoding process akin to the double encoding process is performed at the recipient end, first using the recipient's private key and then decoding the result by utilizing the sender's public key.

It will be appreciated that this approach is rather complex and cumbersome in that it requires double use of the respective coding (i.e. encoding or decoding, as the case may be) technique and/or equipment at each end, and cannot be performed (i.e. successfully commenced and concluded) unless each of the parties has the correct public key of the other party and uses it in conjunction with his or her own correct private key during the respective coding operation. The need for double coding and attendant entry of two different coding keys at each end of the transmission significantly increases the risk that machine or human error could result in the presentation of a garbled or otherwise indecipherable message to the intended recipient.

OBJECTS OF THE INVENTION

It is accordingly an object of the present invention to avoid the aforedescribed disadvantages of the prior art.

More particularly, it is an object of the invention to provide a method of securely transferring data between respective issuers and intended recipients, which method does not possess the disadvantages of previously proposed or utilized methods of this type.

Still another object of the present invention is to devise a method of the type here under consideration which avoids the need for prior knowledge at either of the transmission ends of any coding key being used at the respective other end.

A concomitant object of the invention is to develop a method of the above type that is relatively simple to implement and perform, and yet highly secure and reliable.

SUMMARY OF THE INVENTION

In keeping with these objects and others that will hereinafter become apparent, one feature of the present invention resides in a method for achieving secure data transmission between respective sending and receiving terminals of a telecommunication system. In accordance with one aspect of the present invention, this method comprises the steps of establishing a multiplicity of correlations each defining a relationship for pairing an arbitrary challenge data string in a unique and consistent manner with a different corresponding response data string, and associating each of these multiple correlations with a corresponding one of the individual subscribers, including making each such correlation available to the corresponding individual subscriber and to the server device to enable the corresponding subscriber and the server device to generate one of the arbitrary challenge data string and the corresponding response data string from the other of the arbitrary challenge data string and the corresponding response data string using said each correlation. This method further includes apprising the server device of the identities of an originating subscriber and an intended receiving subscriber for a particular transmission. In accordance with the invention, a message to be conveyed in encrypted form in each particular transmission from the originating subscriber through the server device to the intended receiving subscriber is cryptographically processed. This processing includes the steps of providing a first arbitrary challenge data string to define an originating subscriber pair formed of the first arbitrary challenge data string and a first response data string generated from the first arbitrary challenge data string utilizing the correlation associated with the originating subscriber; generating, at the originating subscriber, the first response data string of the originating subscriber pair utilizing the first arbitrary challenge data string and the correlation associated with the originating subscriber; encrypting the message at the originating subscriber using one of the data strings of the originating subscriber pair; posting the encrypted message and the other of the data strings of the originating subscriber pair to the telecommunications system at the originating subscriber; receiving the encrypted message and the other of the data strings of the originating subscriber pair at the server device; generating the one of the data strings of the originating subscriber pair at the server device utilizing the correlation associated with the originating subscriber; and decrypting the encrypted message at the server device using the said one of the data strings of the originating subscriber pair to recover the message. According to the inventive method, there is further provided a second arbitrary challenge data string at the server device to define a receiving subscriber pair formed of the second arbitrary challenge data string and a second response data string generated from the second arbitrary challenge data string utilizing the correlation associated with the receiving subscriber. The processing further includes re-encrypting the recovered message at the server device using one of the data strings of the receiving subscriber pair, and posting the re-encrypted message and the other of the data strings of the receiving subscriber pair to the telecommunications system at the server device for delivery to the receiving subscriber. The re-encrypted message and the other of the data strings of the receiving subscriber pair are received at the receiving subscriber, the one of the data strings of the receiving subscriber pair is generated at the receiving subscriber utilizing the correlation associated with the receiving subscriber, and the re-encoded message is decrypted at the receiving subscriber using the one of the data strings of the receiving subscriber pair to recover the message from the originating subscriber.

A particularly advantageous implementation of the method of the present invention is obtained when each of the telecommunication system terminals, which are connected with one another through the intervening server device, is associated with an interface device operative for transferring data between the respective terminal and a respective system subscriber card. Moreover, in this preferred implementation, each of the subscriber cards includes at least a data storage and a processor for processing data obtained from the data storage and from the respective terminal and operable for issuing output data to the respective terminal. Each card is also individualized for the respective individual subscriber by storing in its data storage a code key data string that is unique to that subscriber. There is further provided a repository that is accessible to the server device and that stores or enables server access to at least an association between each individual subscriber and the code key data string stored on the individual subscriber's individualized subscriber card.

In that environment, this particular implementation of the method of the present invention is used to perform secure data transmission through the server device between the sending and receiving terminals, with some of the steps of the present method being performed at the sending terminal, others at the server device, and still others at the receiving terminal.

The steps taking place at the sending terminal include: providing a unique original sender challenge data string; transferring the original sender challenge data string to the respective individualized sending subscriber card; processing the original sender challenge data string and the unique code key data string on the respective sending subscriber card to obtain a sender response data string that has a first relationship to the original sender challenge data string, which relationship is unique to the respective sending subscriber card; encoding original data that is to be securely transmitted by one of the sender response and challenge data strings to provide encoded data; and transmitting the encoded data and the other of the sender challenge and response data strings, together with identification of the sending subscriber card in unencrypted form and further information identifying the intended recipient subscriber, to the server device.

These steps are followed by the following steps occurring at the server device: retrieving from the repository the code key data string associated with the thus-identified sending subscriber card; utilizing the unique first relationship determined by the thus-retrieved code key data string to obtain the one from the other of the sender challenge and response data strings; decoding the encoded data utilizing the thus-obtained one of the sender response and challenge data strings; retrieving from the repository the unique recipient subscriber code key data string associated with the subscriber card issued to the intended recipient subscriber as identified in the further information; providing a unique original server challenge data string; processing the original server challenge data string and the retrieved unique recipient subscriber code key data string in the same manner as they would be on the intended recipient subscriber card to obtain a server response data string that has a second relationship to the original server challenge data string, which second relationship is tailored for the respective intended recipient subscriber card; re-encoding the previously decoded data by one of the server response and challenge data strings to provide re-encoded data; and transmitting the re-encoded data, together with the other of the server challenge and response data strings, to a respective receiving terminal associated with the recipient subscriber.

The method is then completed by performing the following steps at the receiving terminal: transferring the other of the server challenge and response data strings to the respective individualized recipient subscriber card; processing the thus-transferred other of the server challenge and response data strings and the unique code key data string on the respective recipient subscriber card to obtain a recipient response data string that corresponds to the one of the server challenge and response data strings when conducted on the intended recipient subscriber card in accordance with the second relationship; and decoding the re-encoded data utilizing the thus-obtained one of the server response and challenge data strings to provide an unencrypted replica of the original data.

It will be appreciated that the method of the present invention as heretofore described greatly simplifies the message encoding/decoding process for both the issuer and the intended recipient of the message in that it is accomplished with neither the issuer nor the intended recipient having to use the respective other subscriber's coding key. As a matter of fact, the respective subscriber does not even have to know or have direct access to the other subscriber's coding key or, for that matter, his or her own such key. Moreover, the process can proceed without either subscriber having to know either the challenge or the response applied at the other subscriber's end or, provided that the respective terminal is programmed to generate the response and perform the coding operation without outside input, even those applicable at his or her own end. In other words, the entire coding process may be implemented so as to be transparent to the two subscribers, e.g. by using a computer-generated random number as the challenge applied at the issuing or sending terminal, thus relieving the communicating subscribers of the burden of obtaining and entering any codes or other data strings to be used in the coding process at his or her end. Furthermore, so long as the code key is not revealed, there is no need to take special precautions beyond those needed to maintain the confidentiality of the message itself in order to conceal the respective challenge or response data string applied at the respective subscriber's end, assuming that such information is available there to begin with.

It is particularly advantageous when, in accordance with an aspect of the present invention, at least one of the encoding and re-encoding steps includes employing the respective response data string to provide the respective encoded or re-encoded data; and wherein that of the transmitting steps which comes up first after the said one of the encoding and re-encoding steps includes sending the respective encoded or re-encoded data accompanied by the respective challenge in unencrypted form. In this further scenario, it is also advantageous when that of the processing and utilizing steps which occurs just prior to the said one of the encoding and re-encoding steps includes utilizing a predetermined algorithm to form the respective response data string in response to the respective challenge data string; and wherein that of the utilizing and processing steps which comes after the aforementioned one of the encoding and re-encoding steps includes utilizing the same predetermined algorithm to make the respective response data string formed in response to the respective challenge data string identical to that used in the one of the encoding and re-encoding steps for use in the following one of the decoding steps.

An important advantage of this approach is that the relationship between the challenge and response data strings need not be symmetrical or reversible in the sense that there need exist an inverse relationship or algorithm operative for unambiguously reconstituting the original challenge data string from the response dam string and the respective subscriber code key, and yet the coding process can proceed. This is so because the same conversion process or algorithm is used at both of the affected stations (i.e. the sending terminal and the decoding part of the server device, or the re-encoding part of the server device and the receiving terminal) in the same direction (i.e. from the unencrypted challenge data string to the response data string), so that a need to proceed in the opposite direction does not arise.

The novel features which are considered as characteristic of the invention are set forth in particular in the appended claims. The improved method of performing secure data transmission itself, together with additional features and advantages thereof, will however be best understood upon perusal of the following derailed description of certain specific embodiments with reference to the accompanying drawing.

BRIEF DESCRIPTION OF THE DRAWING

In the drawings, wherein like reference numerals identify similar elements throughout the several views.

DETAILED DESCRIPTION OF THE PREFERRED EMBODIMENTS

Figure 1:
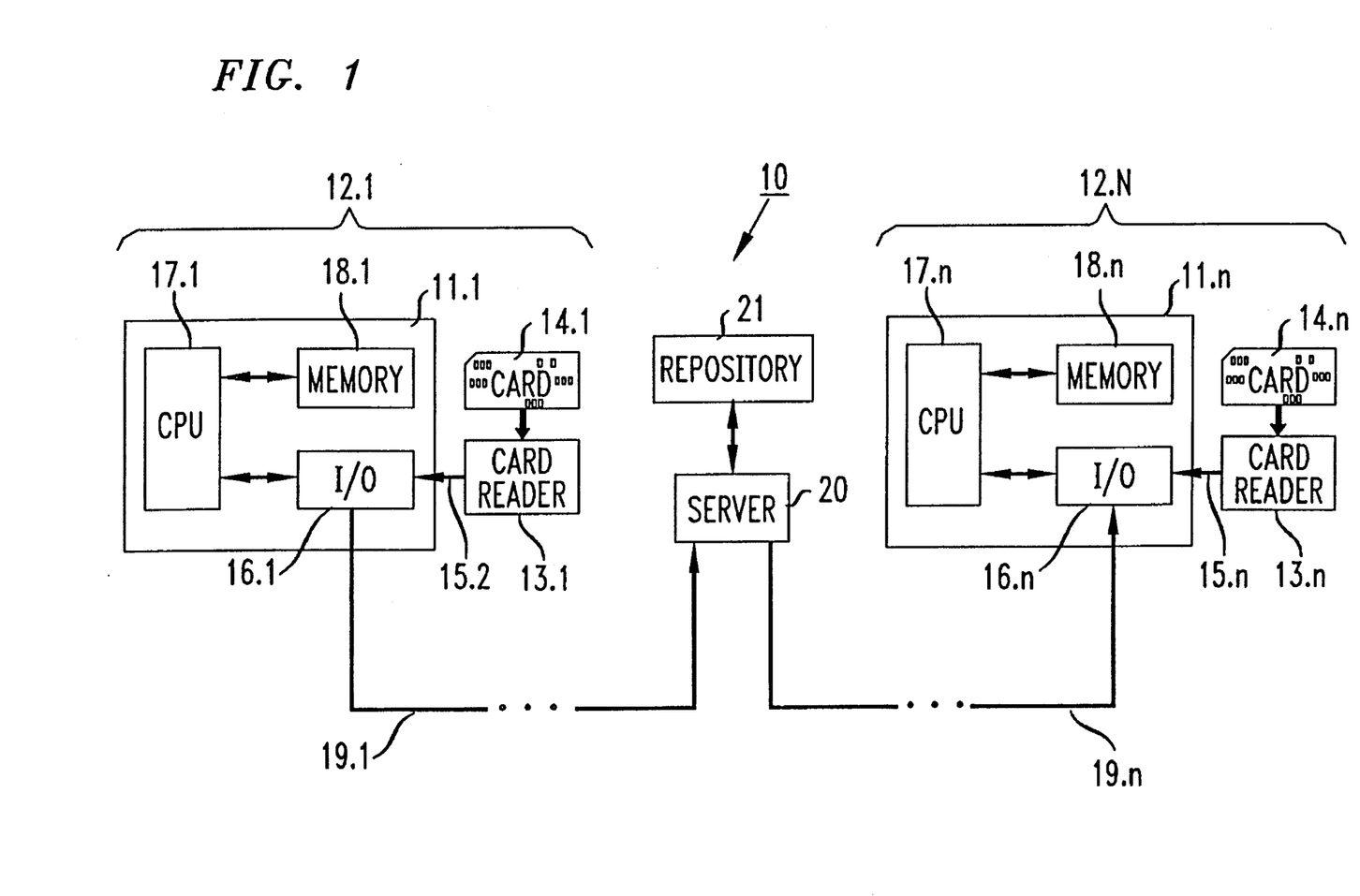
FIG. 1 is a block diagram showing pertinent portions of a transmission system apparatus that may be employed in the practice of the method of the present invention.

Referring now to the drawings, and initially to FIG. 1, it may be seen that the reference numeral 10 has been used therein to identify a telecommunications system of a type suited for performing encryption and decryption processes in accordance with the present invention. The system 10 is shown diagrammatically, and only to the extent necessary to describe and enable a clear understanding of the present invention.

As is well known, the telecommunication system 10 typically includes a very large number of subscriber terminals or stations 11.1 to 11.n (with n denoting any positive integer number exceeding one); however, only those two terminals specifically mentioned above and various devices and/or items associated with each have been illustrated since this is all that is needed to fully describe the inventive method. To further simplify the following explanation, each of the terminals 11.1 to 11.n, together with all associated devices and items, will be collectively referred to as terminal equipment 12.1 to 12.n, and only the terminal equipment 12.1 will be described in some detail as to its basic construction and operation. However, it should be understood that each additional terminal equipment 12.n is identical to the terminal equipment 12.1, if not in all details then at least in those respects, including the presence of corresponding components, that make the various units of terminal equipment 12.1 to 12.n compatible with one another in the sense of being capable of exchanging and processing a variety of data from various sources.

In a currently preferred implementation of the present invention, the terminal equipment 12.1 includes, besides the terminal 11.1 itself, a card reader 13.1 that is constructed, in a known manner, to at least read or retrieve data stored on a compatible subscriber card 14.1. While the card 14.1 is portable and may be used at any of the terminals 11.1 to 11.n, it will for the sake of simplicity be treated here as an item associated with the terminal 11.1 alone and thus constituting a component of the terminal equipment 12.1. For the card 14.1 to be fully capable of use in accordance with all aspects of the present invention, it is contemplated that it advantageously be of at least of the so-called "smart card", if not the "super-smart card", type, as will be explained below in conjunction with FIG. 2. Of course, the card reader 13.1 should be compatible with the card 14.1, whatever its type or capabilities or features.

The card reader 13.1 is connected, as by a data line or bus 15.1, with an input/output (I/O)unit 16.1 of the terminal 11.1. The I/O unit 16.1 is connected with a central processing unit (CPU) 17.1 that, in turn, is connected with a memory or data storage unit 18.1. For purposes of discussion, it will be assumed that the memory unit 18.1 contains the text of a message that is to be sent to the terminal 11.n after it has been encrypted for security during transmission. In this scenario, it will also be assumed that the memory unit 18.n is intended to store the text of the message after it has been decrypted. The actual text encryption and decryption may and typically will be performed by the respective one of the CPU units 17.1 to 17.n. It should be apparent that data transmission can take place from any one of the terminals 11.1 to 11.n to any other, including in a direction opposite to that assumed here, i.e. from the terminal 11.n to the terminal 11.1. Nevertheless, the operation of the system 10 in accordance with the method of the present invention will by way of example be explained here as applied to a situation in which the terminal 11.1 is the originating or transmitting, and terminal 11.n is the receiving, station or terminal.

The transmission between the terminals 11.1 and 11.n in the system 10 of the present invention does not take place directly from terminal to terminal; rather, the I/O units 16.1 of all of the terminals 11.1 to 11.n are connected or linked, through respective data transmission channels (e.g. shielded data transmission lines, cables, busses, optical fiber cables or wireless links or the like) 19.1 to 19.n, with a server device 20. The server device 20 itself, as well as the information contained therein, is maintained in a highly protected, secure manner by the owner or operator of a telecommunication network incorporating or used in conjunction with the system 10. The server device 20 is connected for communication with, or may even physically incorporate, a repository 21 of certain information, including that associating individual subscriber cards 14.1 to 14.n that have been personalized or individualized prior to their issuance to individual subscribers to the system 10, with such subscribers and with secret key codes that have been assigned to each such subscriber in the course of the individualization process. This association information is maintained in the repository 21 in a secure and highly confidential manner. Moreover, while the server device 20 is able to access and retrieve the confidential association and key number information from the repository 21, it can use it for only limited purposes, and well known or otherwise appropriate measures are taken to assure that this information not be released to unauthorized persons, including server device operating personnel with no need to know, or to unauthorized destinations (e.g. computer hacker terminal equipment), or for unauthorized uses.

Figure 2:
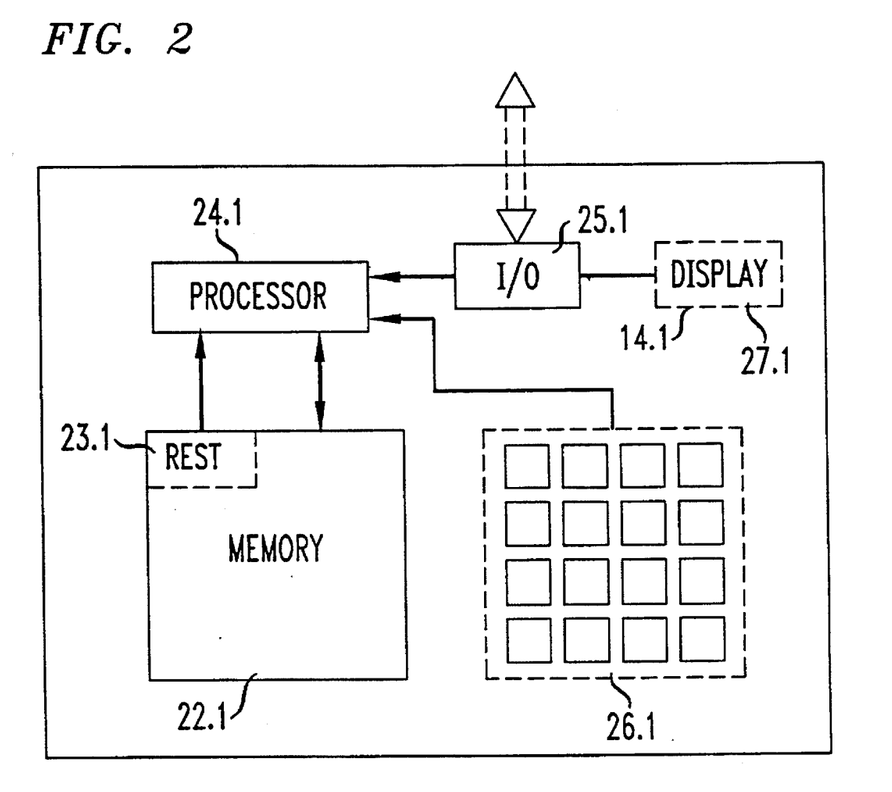
FIG. 2 is another block diagram illustrating various electronic components and circuitry provided on a typical individualized subscriber card that may be used in the system of FIG. 1 for performing encoding of messages and the like in accordance with the method of the present invention.

The safeguarding of this information, which is highly sensitive because its release could result in compromising the secrecy of encrypted communications issued or received by a subscriber affected by the revealing of this information, goes even beyond the securement of the server device 20 in that, as currently preferred, even the subscriber himself or herself does not know or have direct access to his or her code key, although the same is stored by the subscriber's personalized subscriber card 14.1. To this end, the card 14.1 (like each other such card 14.n) may include, as indicated in FIG. 2 of the drawings, a memory 22.1 having at least a portion 23.1 that is protected in the sense that the data contained therein can only be accessed for limited purposes and cannot be "data-dumped", i.e. extracted from the respective card 14.1 either directly or through some manipulation of either the data or of the card. Suitable measures used to achieve this safeguarding feature are known to those skilled in this art and need not be elaborated upon here, particularly since they do not form a part of the present invention.

As also shown in FIG. 2, the respective subscriber card 14.1 further includes a processor 24.1 capable of retrieving information contained in the memory 22.1, inclusive of that secretly maintained in the memory portion 23.1, and of processing such information together with other information or data, as for example that obtained from an input/output (I/O) device 25.1 that is also present on the card 14.1, to generate output information and issue the same through the I/O device 25.1 to the card reader 13.1 for further handling thereat and/or transmission to the terminal 11.1, all in a manner hereinafter described.

Inasmuch as the card 14.1 includes at least basic data storage and processing devices and circuitry, it qualifies for the designation "smart card" that is increasingly being used to describe passive cards with data processing capability— as distinguished from the traditional magnetic strip and similar "memory only" cards. The card 14.1 of this type is not equipped to permit the user or subscriber enter any data into it, and ordinarily does not even include means for displaying any data available in or from the card 14.1. Such capabilities, if needed, must accordingly be provided by other equipment such as the card reader 13.1, the terminal 11.1 and/or keyboard and/or display equipment associated therewith (not shown). In any event, as indicated in broken lines in FIG. 2, the card 14.1 may alternatively be of the "super-smart" type, being in such case additionally provided with a mini-keyboard 26.1 connected with the processor 24.1 to supply data entries thereto, and/or a display device (such as a liquid crystal display) 27.1 for receiving data to be displayed from the processor 24.1 through the I/O device 25.1 and for presenting that data in a visually perceptible form.

Cards of the type thus described are currently available from several sources and under a variety of appellations, including as AT&T Smart Cards, as are the associated card readers and other terminal equipment so that it is not necessary, at this point to describe them in further detail. Suffice it to say that the equipment and circuitry described above, albeit largely conventional in nature, is configured in such manner as to perform certain hereinafter-described tasks in accordance with the present invention.

Having thus described the structural elements and arrangements of the system 10, the features of the currently preferred implementation of the present invention will now be discussed as employed in or in conjunction with the system 10 for generating an encrypted message at the sending or originating terminal 11.1 and for decrypting it at the receiving terminal 11.n, using the respective subscriber cards 14.1 and 14.n at the respective transmission link ends or terminals 11.1 and 11.n.

The operation of the system 10 in accordance with this implementation of the invention commences at the origination or issuing terminal 11.1 in that, when a message is to be sent in a secured (encoded or encrypted) fashion, a challenge data string is presented to the processor 24.1 of the card 14.1. This challenge data string may be internally generated either at the terminal 11.1 or on the card 14.1, or even by the server device 20, as by a random number generator; however, if preferred, the challenge data string may instead by arbitrarily selected and manually or otherwise entered by the subscriber, as for example through the mini-keyboard 26.1 if provided, or through a keyboard associated with the terminal 11.1, or through a similar or functionally equivalent device incorporated in or associated with the card reader 13.1 (the latter two possibilities not having been illustrated). On receipt of the challenge data string, the processor 24.1 located on the card 14.1 retrieves the subscriber's own secret code key from the memory portion or secret memory cache 23.1, and processes the two data strings in accordance with a predetermined or known protocol or algorithm to obtain a response data string. At this juncture, it should be mentioned that even though the algorithm used to arrive at the response data string from the challenge data string is contemplated as being the same for all of the subscriber cards 14.1 to 14.n (and the same as that used at the server device 20, as discussed below), the response data string generated at each of the subscriber cards 14.1 to 14.n will be unique to that subscriber card—that is, different from the response data string obtained from any other of the cards 14.1 to 14.n if any such other card were presented with the identical challenge data string. This different card "reaction" to the challenge string results from the use of the different, unique subscriber code key stored in or on each of the cards 14.1 to 14.n. It will nevertheless be appreciated that the foregoing approach, while currently preferred, is not the only one that may be used in accordance with the present invention to obtain the desired unique relationship or correlation between any arbitrarily chosen challenge data string and the corresponding response data string associated with the particular subscriber and/or his or her card 14.1 to 14.n. Another implementation contemplates a look-up or conversion table instead of or in combination with an appropriate conversion or processing algorithm. In any event, what is important in the context of the present invention is that the correlation applicable to each pair of challenge and response data strings, while different from one subscriber to another, be consistent or reproducible insofar as each particular subscriber is concerned—i.e. that the response data string corresponding to a particular challenge data string is always the same, no matter how many attempts are made and at what location, so long as the correlation associated with the particular subscriber is used to arrive at one of the members of such data string pair from the other.

With the unique card response data string having been generated on the card 14.1, the actual encoding of the message to be transmitted can commence, in one of two presently-contemplated manners using the challenge and response data strings. One is to employ the challenge data string as the encryption key for the message, in which case the response data string would then be sent with the challenge-encrypted message to the server device 20 for use in further handling (i.e. decryption) of the message. The other is to encrypt the message using the response data string and to then send the original challenge data string with the response-encrypted message for similar use at the server device 20. It is currently preferred to use the latter approach in the aforementioned implementation, and the following description will assume that approach; however, it will be appreciated that the principles described in conjunction with this particular method are equally applicable, with only a minimum of self-evident adaptation, to the other alternative as well. The exact algorithm used to encrypt the data or message using either the challenge or the response data string is substantially a matter of design choice.

When the encrypted message and the accompanying information sent with it—which may include, in addition to the challenge data string, at least some information to enable the server device 20 to determine from whom or where the transmission originated (i.e. the identity of the owner of the subscriber card 14.1)—is received by the server device 20, the latter retrieves the code key that is associated with the originator's subscriber card 14.1 (i.e. the code key that is stored on the card 14.1) from the repository 21. The server device 20 then processes the thus-retrieved subscriber code key and the (unencrypted) original challenge data string that had been received from the terminal 11.1 as a part of the transmission, in the same way (i.e. using the same algorithm or correlation) as that used by the originating subscriber to generate the response data string with which the original message was encrypted. Using the same starting values and processing operations at the server device 20 as were used at the subscriber site, the server device 20 thus generates a response data string to the challenge data string that is identical to that which was generated using the subscriber card 14.1 and used to encode the original message received by the server device 20. The server device 20 then uses this information to decrypt the encoded message and to thereby restore it to its original unencrypted state.

As will be apparent, since the server device 20 is only an intermediary in the transmission and not the intended ultimate recipient, steps must be taken to safeguard the message as it is next transmitted from the server 20 to the recipient terminal 11.n. Toward that end, the message is re-encrypted before it is transmitted from the server device 20 to the receiving terminal 11.n; in brief, the server device 20 employs substantially the same technique as that described above between the originating subscriber and the server device 20, but now geared toward the ultimate recipient. First, the server device 20 determines, as from the message itself—where this information may be a part of the encoded text (cryptotext), or may have accompanied the encrypted text in unencrypted (plaintext) form—the identity of the intended ultimate recipient and correspondingly, identifies the subscriber card 14.n issued to that subscriber. With this information, the server device 20 accesses the repository 21 to retrieve the secret code key for that subscriber and which is embedded in the restricted memory portion 23.n of the receiving subscriber card 14.n. From there, the process is the same as that discussed above—the server device 20 produces a response data string to a locally-generated random number challenge data string using the same algorithm as before, uses the resulting response data string to re-encrypt the previously deciphered or decrypted message, and sends the so re-encoded message, together with new unencrypted challenge data string, to the recipient terminal 11.n.

Upon receipt of this re-transmission at the recipient terminal 11.n, or as and when instructed to do so at some later time by the recipient subscriber, the challenge data string is sent to the card reader 13.n. Assuming that the proper card 14.n (i.e. that of the intended recipient) is present in the card reader 13.n, the challenge data string is processed by the processor 24.n of the card 14.n using the same code key (this time retrieved from the memory 22.n of the subscriber card 14.n) and the same algorithm or correlation as that previously used by the server device 20 to produce the identical response data string with which the message was re-encrypted. The resulting response data string generated by the processor 24.n of the subscriber card 14.n is then used by the receiving subscriber at the terminal 11.n to decrypt the server re-encrypted message—i.e. to restore it to the original, unencrypted form with which the originating subscriber initiated the transmission process.

An example of a transmission in accordance with the invention will now be described to further illustrate the features explained above, using italics to indicate unencrypted portions of the transmission, square brackets to indicate encrypted or re-encrypted portions of the transmission, quotation marks for identification information, and parentheses for explanatory matter.

The transmission sent from the originating terminal 11.1 may by way of example read as follows:

(header:) to "server" from "subscriber1"

(body:) challenge1,[message1 ],
wherein [message1 ]contains:

[(header:) to "subscriber2"

(body:) message], and wherein response1 (to challenge1) has been used to encode the [message1].

Using the thus-received "subscriber1" information, the server device 20 retrieves the associated code key from the repository 22 and uses it, together with challenge1, to recreate response1. It then uses the thus-obtained response1 to regenerate (decrypt) message1 from [message1]. That will reveal the "subscriber2" information to the server device 20 and permit the "subscriber2" information to be used to similarly retrieve the intended recipient code key from the repository 21 and to use the retrieved recipient code key, together with a locally-generated challenge2, to produce a response2 that is then used to form a re-encrypted [message1] which is included in a transmission sent to the terminal 14.n associated with "subscriber2" and reading, basically, as follows:

(header:) to "subscriber2" from "server"

(body:) challenge2, [message2],
wherein [message2] contains:

[(header:) from "subscriber1"

(body:) message].

The intended recipient, after becoming aware of the arrival of such transmission, uses his or her subscriber card 14.n to generate the response2 to the server-transmitted challenge2, and to decrypt [message2] using the thus obtained response2 to restore message2 and thus message to its original, usually plaintext form.

The example presented above has particular but not exclusive utility when it is desired to conceal the fact that the originating and receiving subscribers are communicating. Incipient business merger contacts and negotiations between warring political entities may provide illustrative examples of situations in which the release of information that particular parties are "talking" could be detrimental, irrespective of the actual contents of the exchanged messages. However, where for example this information is not sensitive, the identification of the intended recipient may be indicated by the originating subscriber directly or outside of the "envelope" containing (i.e. as a plaintext part of the header of) the encrypted [message1]. In other words, the originating header might then read: to "subscriber2" from "subscriber1", and the same or similar language might also be used in the header sent by the server device 20 to the intended recipient. The transmission would nonetheless still be intercepted by the server device 20 between the originating and receiving subscribers and processed thereat in a manner substantially identical to that described above. The involvement of or intervention by the server device 20 in the transmission would, in such an arrangement, be transparent to both the originator and the recipient of the transmission.

While the invention has been illustrated and described as embodied in a particular arrangement and apparatus, it is not intended to be limited to the details shown since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the contribution to the art and, therefore, such adaptations should and are intended to be comprehended as within the meaning and range of equivalence of the claims. What is claimed as new and desired to be protected by Letters Patent is set forth in the appended claims.

What is claimed is:

1. A method of performing secure data transmission of messages between individual subscribers of a telecommunications system that includes individual terminals linked by a server device, comprising the steps of:

establishing a multiplicity of correlations each defining a relationship for pairing an arbitrary challenge data string in a unique and consistent manner with a different corresponding response data string;

associating each of said multiple correlations with a corresponding one of the individual subscribers, and making said each correlation available to the corresponding individual subscriber and to the server device to enable the corresponding subscriber and the server device to generate one of the arbitrary challenge data string and the corresponding response data string from the other of the arbitrary challenge data string and the corresponding response data string using said each correlation;

apprising the server device of the identities of an originating subscriber and an intended receiving subscriber for a particular transmission; and cryptographically processing a message to be conveyed in encrypted form in each said particular transmission from the originating subscriber through the server device to the intended receiving subscriber, comprising the steps of:

providing a first arbitrary challenge data string to define an originating subscriber pair formed of the first arbitrary challenge data string and a first response data string generated from the first arbitrary challenge data string utilizing the correlation associated with the originating subscriber;

generating, at the originating subscriber, the first response data string of the originating subscriber pair utilizing the first arbitrary challenge data string and the correlation associated with the originating subscriber;

encrypting the message at the originating subscriber using one of the data strings of the originating subscriber pair, and posting the encrypted message and the other of the data strings of the originating subscriber pair to the telecommunications system at the originating subscriber;

receiving the encrypted message and the other of the data strings of the originating subscriber pair at the server device, generating the one of the data strings of the originating subscriber pair at the server device utilizing the correlation associated with the originating subscriber, and decrypting the encrypted message at the server device using the said one of the data strings of the originating subscriber pair to recover the message;

providing a second arbitrary challenge data string at the server device to define a receiving subscriber pair formed of the second arbitrary challenge data string and a second response data string generated from the second arbitrary challenge data string utilizing the correlation associated with the receiving subscriber;

re-encrypting the recovered message at the server device using one of the data strings of the receiving subscriber pair, and posting the re-encrypted message and the other of the data strings of the receiving subscriber pair to the telecommunications system at the server device for delivery to the receiving subscriber;

receiving the re-encrypted message and the other of the data strings of the receiving subscriber pair at the receiving subscriber, generating the one of the data strings of the receiving subscriber pair at the receiving subscriber utilizing the correlation associated with the receiving subscriber, and decrypting the re-encoded message at the receiving subscriber using the said one of the data strings of the receiving subscriber pair to recover the message from the originating subscriber.

2. The method as defined in claim 1, wherein said associating step includes providing each said individual subscriber with an individualized card that includes a data storage containing an individual code key unique to said corresponding individual subscriber, storing said individual code keys for all of said individual subscribers in a repository accessible to the server device in a manner identifying each said key code with the corresponding individual subscriber, and providing each of said individual subscribers and said server device with access to an algorithm that establishes the correlation of said each individual subscriber when used in conjunction with the code key of said each individual subscriber, and wherein said step of making said each correlation available includes retrieving the respective code key and said algorithm at each of said individual subscribers and at said server device for use in said generating steps.

3. The method as defined in claim 2, wherein said associating step further includes providing each of said individual subscriber cards with data processing capability; and wherein said steps of generating said first response data string of the originating subscriber pair at the originating subscriber and said one of said data strings of the receiving subscriber pair at the receiving subscriber include processing said first arbitrary challenge data string and said other of said receiving subscriber data strings on a respective one of the originating and receiving subscriber cards utilizing the correlation associated with the originating and with the receiving subscriber, respectively, as obtained from the respective subscriber card.

4. A method of performing secure data transmission between respective sending and receiving telecommunication system terminals that are connected with one another through a server device, each of said terminals being associated with an interface device operative for transferring data between the respective terminal and a respective system subscriber card that includes at least a data storage and a processor for processing data obtained from the data storage and from the respective terminal and operable for issuing output data to the respective terminal, each of the subscriber cards being individualized prior to issuance thereof to a respective individual subscriber by storing in its data storage a unique code key data string, with at least an association between each individual subscriber and the unique code key data string stored on that individual subscriber's individualized subscriber card being stored in a repository accessible to the server device, comprising the steps of:

(A) at a respective sending terminal:
  (i) providing a unique original sender challenge data string;
  (ii) transferring the original sender challenge data string to the respective individualized sender subscriber card;
  (iii) processing the original sender challenge data string and the unique code key data string on the respective sender subscriber card to obtain a sender response data string that has a first relationship to the original sender challenge data string, which relationship is unique to the respective sending subscriber card;
  (iv) encrypting original data that is to be securely transmitted by the sending subscriber using one of the sender response data string and the challenge data string to provide encrypted data; and
  (v) transmitting the encrypted data and the other of the sender challenge data string and the response data string to the server device;

(B) at the server device:
  (i) receiving from the sending terminal the encrypted data and the other of the sender challenge data string and the response data string;
  (ii) retrieving from the repository the code key data string associated with the subscriber card of the sending subscriber;
  (iii) utilizing the unique first relationship of the retrieved code key data string to obtain the one from the other of the sender challenge data string and the response data string;
  (iv) decrypting the received encrypted data utilizing the thus obtained one of the sender response data string and the challenge data string;
  (v) retrieving from the repository the unique recipient subscriber code key data string associated with the subscriber card issued to the intended recipient subscriber;
  (vi) providing a unique server challenge data string;
  (vii) processing the server challenge data string and the retrieved unique recipient subscriber code key data string to obtain a server response data string that has a second relationship to the original server challenge data string, which relationship is tailored for the respective intended recipient subscriber card;
  (viii) re-encrypting the server-decrypted data using one of the server response data string and the server challenge data string to provide server re-encrypted data; and
  (ix) transmitting the server re-encrypted data, together with the other of the server challenge data string and the server response data string, to a respective receiving terminal associated with the recipient subscriber; and (C) at the respective receiving terminal:
  (i) receiving from the server device the server re-encrypted data and the other of the server challenge data string and the server response data string;
  (ii) transferring the other of the server challenge data string and the server response data string to the respective individualized recipient subscriber card;
  (iii) processing the received other of the server challenge data string and the server response data string and the unique code key data string on the respective recipient subscriber card to obtain a resultant recipient data string corresponding to the one of the server challenge data string and the server response data string used for the encryption at the server device; and (iv) decrypting the server re-encrypted data utilizing the one of the received server response data string and the server challenge data string to provide a replica of the original data.

5. The method as defined in claim 4, wherein at least one of said encrypting and re-encrypting steps includes employing the respective response data string to provide one of the respective encrypted and re-encrypted data; and wherein said step of transmitting said one of said encrypted and re-encrypted data includes sending the respective challenge data string with such data.

6. The method as defined in claim 5, wherein at least one of said processing steps and an associated one of said utilizing steps use an identical algorithm to form the respective response data string in response to the respective challenge data string.

7. A method of performing secure data transmission of messages between individual subscribers of a telecommunications system that includes individual terminals linked by a server device, comprising the steps of:

establishing a multiplicity of correlations each defining a relationship for pairing an arbitrary challenge data string in a unique and consistent manner with a different corresponding response data string;

making each of said multiple correlations available to a corresponding one of the individual subscribers, and all of said multiple correlations available to the server device in identifying associations with said corresponding individual subscribers;

apprising the server device of the identities of an originating subscriber and an intended receiving subscriber for a particular transmission;

cryptographically processing an original message to be conveyed in encrypted form in said particular transmission from the originating subscriber through the server device to the intended receiving subscriber, comprising the steps of:

generating an originating subscriber pair of the challenge and response data strings at one of said originating subscriber and server device utilizing the correlation associated with the originating subscriber;

communicating one of the data strings of said originating subscriber pair from said one to the other of said originating subscriber and server device;

regenerating the other of the data strings of said originating subscriber pair at the other of said originating subscriber and server device from the thus communicated one data string;

encrypting the message at the originating subscriber using said other of the data strings of the originating subscriber pair;

posting the encrypted message to the telecommunications system at the originating subscriber;

receiving the encrypted message at the server device;

decrypting the encrypted message at the server device using the said other of the data strings of the originating subscriber pair to recover the message; and cryptographically reprocessing the thus recovered message at the server device and at the receiving subscriber in a manner corresponding to that employed in the performance of said cryptographically processing step at the originating subscriber and at the server, utilizing the correlation associated with the receiving subscriber in place of that associated with the originating subscriber.

\* \* \* \* \*